Dec. 5, 1933.   A. LYSHOLM   1,938,076
COOLING MEANS FOR CLOSED ELECTRICAL MOTORS,
GENERATORS, OR THE LIKE MACHINES
Filed April 28, 1930   2 Sheets-Sheet 2

Patented Dec. 5, 1933

1,938,076

UNITED STATES PATENT OFFICE 1,938,076

COOLING MEANS FOR CLOSED ELECTRICAL MOTORS, GENERATORS, OR THE LIKE MACHINES

Alf Lysholm, Stockholm, Sweden, assignor to Aktiebolaget Ljungströms Ångturbin, Stockholm, Sweden, a joint-stock company of Sweden Application April 28, 1930, Serial No. 448,005, and in Germany May 2, 1929

5 Claims. (Cl. 171—252)

Cooling means for closed electrical motors, generators or the like machines are already known, in which cooling is effected by means of air circulated by fans, which air flows around the parts of the machine to be cooled and then around cooling elements by which the air is cooled down again. As a cooling medium for the cooling elements there has been used another air current or water. The cooling constructions hitherto known, especially those in which water serves as cooling medium, are very bulky and require a large space on the side of or under the electrical machine. In certain embodiments the cooling elements are arranged integral with the jacket surrounding the machine or built in the same. Such arrangements, however, have provided insufficient cooling effect to obtain the desired or necessary amount of cooling.

The present invention relates to cooling devices for electrical machines and has for a general object the provision of apparatus, by means of which the above mentioned disadvantages are eliminated and the cooling effect is increased. The invention consists in the provision of cooling elements which are straight, and if desired, flattened tubes arranged in one or several groups, which are situated in a plane at right angles or substantially at right angles to the axis of rotation of the machine. Further characteristic features of the invention will appear from the following description of a preferred embodiment which is illustrated in the accompanying drawings.

Figure 1:
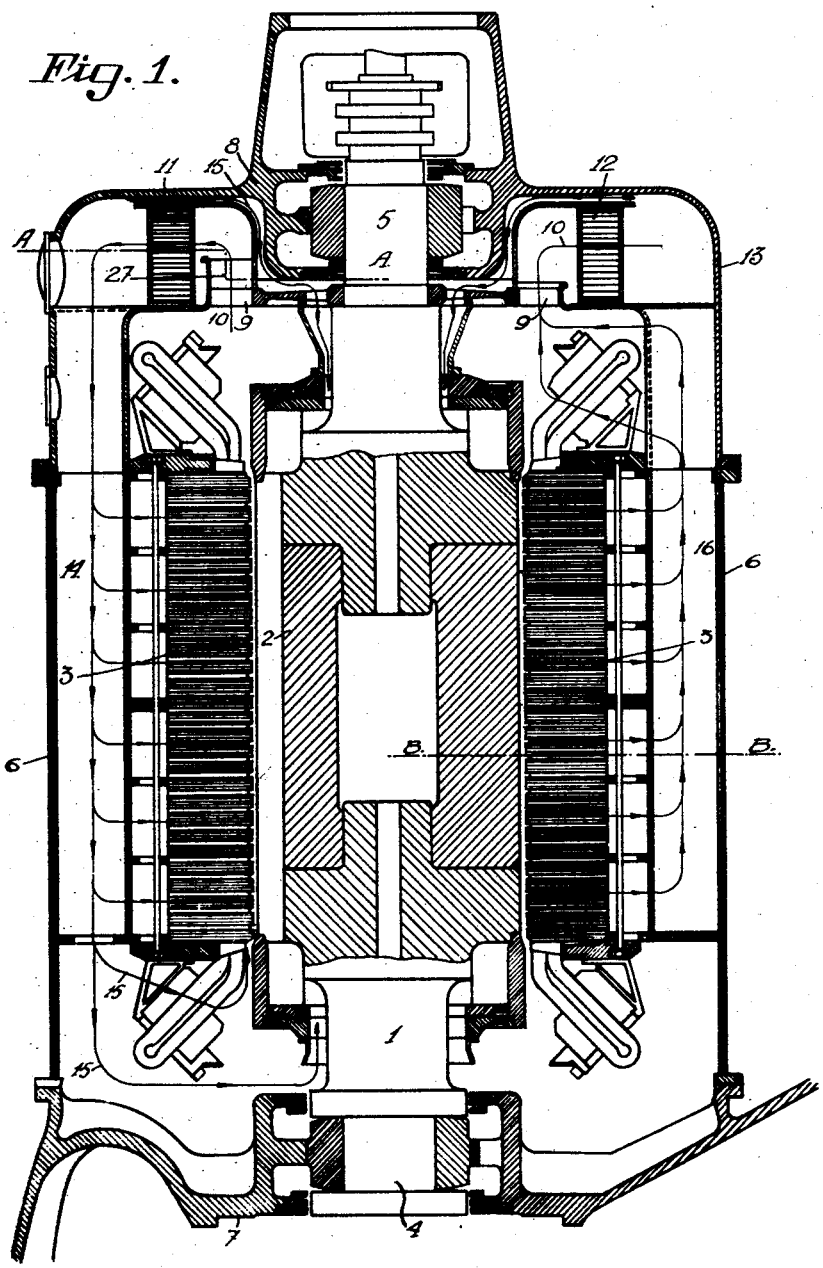
Fig. 1 is a longitudinal section through an electrical generator.
Figure 2:
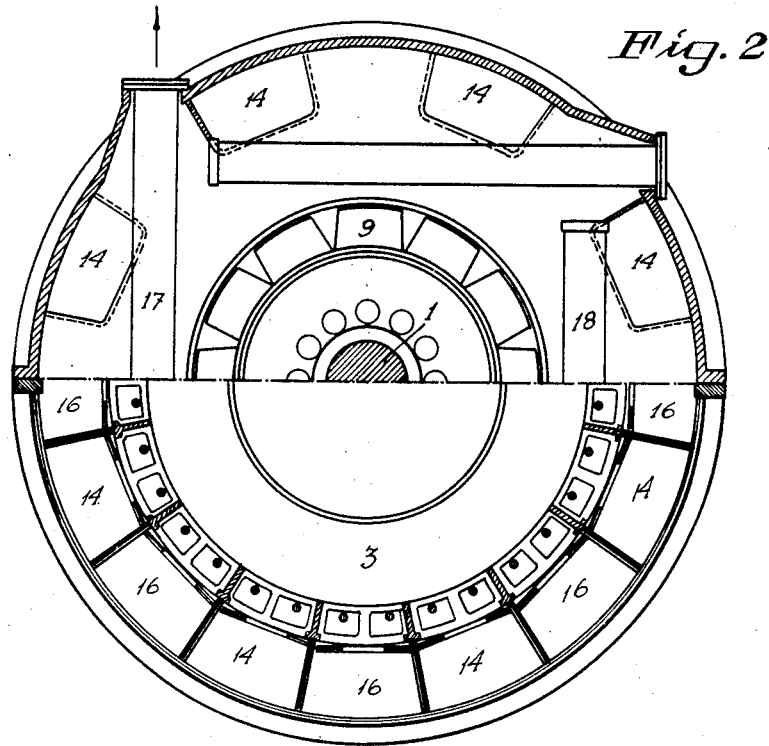
Fig. 2 shows a transversal section through the same, the upper part thereof being a section on the line A—A and the lower part being a section on the line B—B in Fig. 1.

Referring to Fig. 1, the generator shaft is indicated by 1, the rotor by 2 and the stator by 3. The shaft 1 is journalled at 4 and 5 in end pieces 7 and 8 comprising a part of the generator housing 6. On the shaft 1 adjacent to the bearing 5 is arranged a fan 9 which under working conditions of the machine circulates the air in the housing 6 radially outwardly in the direction of the arrow 10 and through the cooling elements arranged in groups 11 and 12, respectively. These cooling elements are arranged within the same housing 6 which surrounds the generator or in a housing 13 which forms a continuation of the former. One or both ends of the elements are situated on the outside of this housing. In the outermost part of this housing 6 or in the housings 6 and 13 are arranged channels which guide the air from and to the parts of the machine to be cooled. The air, which has passed the group 11, is led through a channel 14 where it flows, as indicated by the direction of the arrow, around the plates of the armature. A portion of the air flowing in the channel 14 is also led, as indicated by the arrows 15, between parts in the neighbourhood of the rotor shaft and the rotor. The channel 14 occupies only a small part of the outer portion of the housing 6 and is bounded by radial walls, as clearly shown in Fig. 2. In Fig. 2 the channels in the upper part, which guide the cold air, are designated with 14, while the spaces, in which air is guided from the interior of the machine to the cooling elements, are designated with 16. The cooling air thus flows in a radial direction past the plates of the armature, both towards the interior and also towards the exterior, and is guided through the channels 16 back to the fan (compare also the lower part in Fig. 1).

Figure 3:
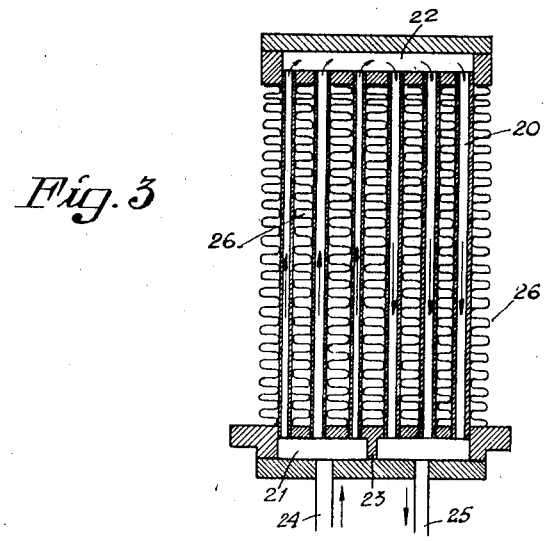
Fig. 3 is a detail drawing of the cooling device.

In the embodiment above described, the cooling elements are arranged in four groups 11, 12, 17 and 18. The groups have one end securely fixed to the outer part of the surrounding housing with flanges and bolts which are easily accessible from the outside. Each element group, for instance 17, may therefore easily be taken out in the direction of the arrow shown adjacent to element 17 after the bolts have been removed and replaced by other element groups which have to be inserted in the opposite direction. These groups comprise several elements, as disclosed in Fig. 3, the elements 20 being arranged with their ends in distribution chambers 21 and 22 respectively, in which the water flows, by means of which the air is to be cooled. The chamber 21 is divided by means of a partition 23 into two parts, one part of which is connected with a supply conduit 24 for water and the other part is connected with a discharge conduit 25. The water flows, as indicated by the arrows, first in one direction through a certain number of elements and then the opposite direction through the other elements in the same group. The elements consist of flattened tubes which are separated from each other by corrugated plates 26 which, if desired, may be soldered on the flat sides of the flattened tubes. These sides may also in known manner be provided with projecting ridges and flanges and, if desired, in directions crossing each other. The air, therefore, contacts a large area in comparison to the area which is in contact with the cooling water, which is in accordance with the ratio of the coefficients of heat transfer between air and metal and between metal and water, respectively. These groups are arranged radially in the end of the housing beyond the fan 9, preferably in the form of a geometrical figure. In the embodiment here described the groups are arranged in the form of a square, in the center of which the rotor axle is situated. When using a smaller or greater number of elements other arrangements in other figures are conceivable. It will be evident that the several groups of cooling elements each comprise what may be termed a separate cooling unit which is not only readily removable from the casing of the machine for purposes of repair or replacement but which is also, due to its manner of mounting within the casing, relieved of all strains incident to expansion and contraction relative to the casing. In order to discharge any water which might possibly leak from the elements, the outer ring 27 bordering the fan is formed as a groove through which the water may be led away to a pipe which, if desired, may be tapped in the housing.

By means of the construction according to the invention an installation having sufficient cooling effect will require less space than hitherto known installations. A generator which is cooled in accordance to this invention, therefore, is very suitable for turbo-generators, in which case the generator is mounted with one end, for instance with the end adjacent to the bearing 4, on the housing of a turbine with which the generator is connected, while the other end of the generator carries, in the manner above described, the groups of cooling elements which do not require to be specially supported.

Several embodiments of the invention are conceivable, and the invention therefore may also be applied to all electrical machines of the same kind independent of the purpose of the machine.

What I claim is:—

1. In an electric machine, a closed casing, heat developing members including a rotor within said casing, cooling means within said casing, means for circulating air within said casing in contact with said members and with said cooling means, said cooling means comprising groups of cooling elements arranged peripherally about the center of rotation of said rotor, said elements comprising spaced conduits each having a non-circular cross-section the greatest dimension of which lies in a plane radial with respect to said rotor so that air flows through said elements in a radial direction, means for circulating a cooling medium through said conduits and means forming a channel adjacent to said elements for collecting cooling medium leaking from said elements and conducting it away from said heat developing members.

2. In an electric machine, a closed casing, heat developing members including a rotor within said casing, cooling means within said casing, means for circulating air within said casing in contact with said members and with said cooling means, said cooling means comprising a plurality of groups of cooling elements extending transversely of said casing and arranged for radial flow of air therebetween, means for circulating a cooling medium through said cooling elements and means for directing cooling medium leaking from said elements away from said heat developing members.

3. In an electric machine, a closed casing, heat developing members including a rotor within said casing, a transverse partition adjacent to one end of said casing, cooling elements in the space between said partition and said one end of said casing, said elements extending transversely of the casing and being axially spaced to provide radially extending passages therebetween, means for circulating air within said casing in contact with said heat developing members and said cooling elements, means for circulating a cooling medium through said cooling elements and means for preventing cooling medium leaking from said elements from passing to the side of said partition opposite the cooling elements.

4. In an electric machine, a closed casing, heat developing members including a rotor within said casing, cooling means within said casing, means for circulating air within said casing in contact with said heat developing members and with said cooling means, said cooling means comprising a plurality of groups of cooling elements extending transversely of said casing, each of said groups comprising a separate unit projecting into the casing from the periphery thereof and fixed to the casing at one end only of the unit and freely expansible from the fixed end thereof relative to the casing and means for supplying cooling medium to and for withdrawing cooling medium from each of said units at the same end thereof.

5. In an electric machine, a closed casing, heat developing members within said casing, a plurality of cooling units extending into said casing from the periphery thereof, each of said units being fixed to the casing at one end only of the unit and being freely expansible from the fixed end relative to the casing, and each of said units comprising a plurality of cooling elements arranged for radial flow of air therebetween, the major portion of said cooling elements being disposed radially closer to the axis of the machine than portions of said heat developing members, means for supplying cooling medium to and for withdrawing cooling medium from the same end of each of said cooling units, and means for circulating air within said casing in contact with said heat developing members and with said cooling elements.

ALF LYSHOLM.